(12) United States Patent
Oh et al.

(10) Patent No.: US 9,489,227 B2
(45) Date of Patent: Nov. 8, 2016

(54) APPARATUS AND METHOD FOR VIRTUAL DESKTOP SERVICE

(71) Applicant: ELECTRONICS AND TELECOMMUNICATIONS RESEARCH INSTITUTE, Daejeon (KR)

(72) Inventors: Myeong-Hoon Oh, Daejeon (KR); Dae Won Kim, Daejeon (KR); Sun Wook Kim, Hwaseong (KR); Soo Cheol Oh, Daejeon (KR); Seong Woon Kim, Gyeryong (KR); Hag Young Kim, Daejeon (KR); Jong Bae Moon, Daejeon (KR); Jung-hyun Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/300,463

(22) Filed: Jun. 10, 2014

(65) Prior Publication Data
US 2014/0366093 A1    Dec. 11, 2014

(30) Foreign Application Priority Data

Jun. 10, 2013  (KR) .................. 10-2013-0065762
Oct. 21, 2013  (KR) .................. 10-2013-0125206

(51) Int. Cl.
| | |
|---|---|
| *G06F 9/455* | (2006.01) |
| *H04L 29/06* | (2006.01) |
| *G06F 21/10* | (2013.01) |
| *G06F 21/53* | (2013.01) |
| *G06F 9/44* | (2006.01) |
| *G06F 9/50* | (2006.01) |
| *G06F 9/445* | (2006.01) |

(52) U.S. Cl.
CPC ......... *G06F 9/45533* (2013.01); *G06F 9/4445* (2013.01); *G06F 9/5072* (2013.01); *G06F 21/10* (2013.01); *G06F 21/53* (2013.01); *H04L 63/08* (2013.01); *G06F 9/4451* (2013.01); *G06F 2009/45575* (2013.01); *G06F 2221/2101* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 8,010,679 B2* | 8/2011 | Low et al. ................... 709/227 |
| 8,914,511 B1* | 12/2014 | Yemini et al. ................ 709/226 |
| 9,086,897 B2* | 7/2015 | Oh ........................ G06F 9/4445 |
| 2010/0211663 A1* | 8/2010 | Barboy ............ G06F 17/30233 709/223 |
| 2012/0084381 A1* | 4/2012 | Alladi ..................... G06F 9/544 709/213 |
| 2013/0275975 A1* | 10/2013 | Masuda et al. ................... 718/1 |

* cited by examiner

*Primary Examiner* — Kaveh Abrishamkar
(74) *Attorney, Agent, or Firm* — Staas & Halsey LLP

(57) ABSTRACT

Disclosed herein are a method and architecture capable of efficiently providing virtual desktop service. A service architecture for virtual desktop service according to the present invention includes a connection broker configured to perform authentication, manage virtual machines, and perform a server monitoring and protocol coordination function, a resource pool configured to manage software resources that are delivered to a specific virtual machine in a streaming form on a specific time in order to provide on-demand virtual desktop service and are executed on the specific virtual machine and to provide provision information about the managed software resources in response to a request from the connection broker, and a virtual machine infrastructure configured to support hardware resources, generate virtual machines in which the software of a user terminal is executed, and provide the generated virtual machine as virtual desktops.

8 Claims, 17 Drawing Sheets

APPARATUS AND METHOD FOR VIRTUAL DESKTOP SERVICE

CROSS REFERENCE TO RELATED APPLICATION

This application claims the benefit of Korean Patent Application No. 10-2013-0065762 filed on Jun. 10, 2013, and No. 10-2013-0125206, filed on Oct. 21, 2013, which is hereby incorporated by reference in its entirety into this application.

BACKGROUND OF THE INVENTION

1. Technical Field

The present invention relates to an apparatus and method for the virtual desktop service.

2. Description of the Related Art

In these days, researches and standardization activities for virtual desktop service, that is, service for providing a data storage hard disk and applications to an Internet space, are actively being performed.

Korean Patent Application publication Nos. 2010-0123847, 2009-0111576, and 2009-0111576 disclose virtual desktop service technologies in detail.

However, architecture for such virtual desktop service has not been standardized, and thus there is a problem in that virtual desktop service is not efficiently provided to users.

Korean Patent Application publication No. 2009-0108868 discloses technology regarding a virtual machine administration system capable of assigning a processor to a plurality of virtual machines, but it is difficult to apply the Korean patent application publication to a method of constructing a system for virtualization management.

Accordingly, there is an urgent need for a newer technology in order to provide a virtualization desktop environment and manage a virtualization desktop system.

Virtual desktop service is service for providing a hard disk for storing data and applications in an Internet space. In the virtual desktop service, a virtual machine being executed in a virtualization desktop server is connected to a client system and used.

A common PC is used as a client system for virtual desktop service so far. In such a conventional environment, however, there is a disadvantage in that a user has to directly execute dedicated software through the OS of the client system.

Conventional methods for providing a virtual desktop include a method of providing terminal service called Remote Desktop Connection (RDC) using a remote Desktop Protocol (RDP) by Microsoft (MS), a method of providing terminal service called Virtual Network Computing (VNC) using a Remote FrameBuffer (RFB) protocol by Linux, and a method of providing a terminal service solution using a protocol called PC-over-IP (PCoIP) by Teradici.

In order to perform virtual desktop service using such conventional methods, a virtual desktop function has to be provided to each user. In order to provide the virtual desktop function, devices (e.g., a CPU, memory, a HDD, and a USB) corresponding to each user have to be provided to the user and an Operating System (OS) image for the user needs to be assigned.

Public tools for providing such a function include virt-tool and virt-manager. A virtual machine for a user can be created and generated using a program, such as 'xendesktop', 'VMware Fusion', or 'workstation' by Citrix. However, such conventional methods are not suitable for providing real-time virtual service because they are manually provided tools.

SUMMARY OF THE INVENTION

An object of the present invention is to provide an architecture capable of efficiently providing virtual desktop service.

Technical objects to be achieved by the present invention are not limited to the above-described objects and other technical objects that have not been described will be evidently understood by those skilled in the art from the following description.

In accordance with an aspect of the present invention, there is provided an apparatus for virtual desktop service, including a connection broker configured to perform a task of assigning a virtual machine to a user terminal using the virtual desktop service and a coordination task of a delivery protocol used between the user terminal and servers that provide the virtual desktop service and to manage a user load between the servers; a resource pool configured to provide software resources, comprising an operating system, applications, and user profiles for the virtual desktop service; and a virtual machine infrastructure configured to support hardware resources and to dynamically assign software, stored in the software resources, to the hardware resources.

The connection broker may further perform a user authentication task of authenticating a user of the user terminal and a license authentication task of authenticating software of the user terminal.

The connection broker may enable perform the task of assigning the hardware resources and the software resources to the user terminal using the resource pool and the virtual machine infrastructure.

The virtual machine infrastructure may include a hypervisor for dynamically assigning the hardware resources and the software resources.

In accordance with another aspect of the present invention, there is provided a virtual desktop service method, including checking, by a connection broker, user profiles of a user terminal for virtual desktop service and searching for a virtual machine suitable for hardware of the user terminal; requesting, by the connection broker, a virtual machine infrastructure to generate a corresponding virtual machine if the suitable virtual machine is not present and applying, by the connection broker, the user profiles to a corresponding virtual machine if the suitable virtual machine is present and generating a virtual desktop; and sending, by the connection broker, connection information for sending the generated virtual desktop to the user terminal to the user terminal and sending the virtual desktop to the user terminal using the delivery protocol of the virtual desktop.

DESCRIPTION OF THE PREFERRED EMBODIMENTS

Figure 1:
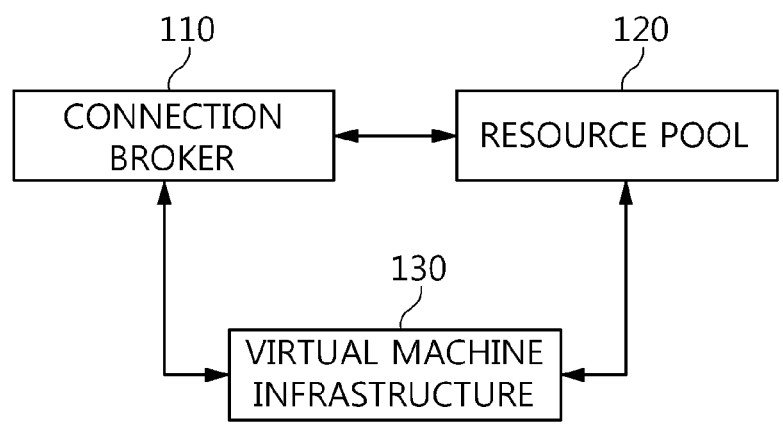
FIG. 1 is a diagram showing a service architecture for virtual desktop service in accordance with an embodiment of the present invention.

Hereinafter, in this specification, the contents of the present invention will be described in detail in connection with some exemplary embodiments, with reference to the accompanying drawings. It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

Furthermore, in describing the elements of this specification, terms, such as the first, the second, A, B, (a), and (b), may be used. However, although the terms are used only to distinguish one element from the other element, the essence, order, or sequence of the elements is not limited by the terms. When it is said that one element is 'connected', 'combined', or 'coupled' with the other element, the one element may be directly connected or coupled with the other element, but it should also be understood that a third element may be 'connected', 'combined', or 'coupled' between the two elements.

FIG. 1 is a diagram showing a service architecture for virtual desktop service in accordance with an embodiment of the present invention.

From a viewpoint of a service provider, there are several steps in order to provide an end user with virtual desktop service. As shown in FIG. 1, the steps may be performed by three major actors including a Connection Broker (CB) 110, a resource pool 120, and a Virtual Machine (VM) infrastructure 130.

The functions of the three major actors are described below with reference to FIG. 2.

Figure 2:
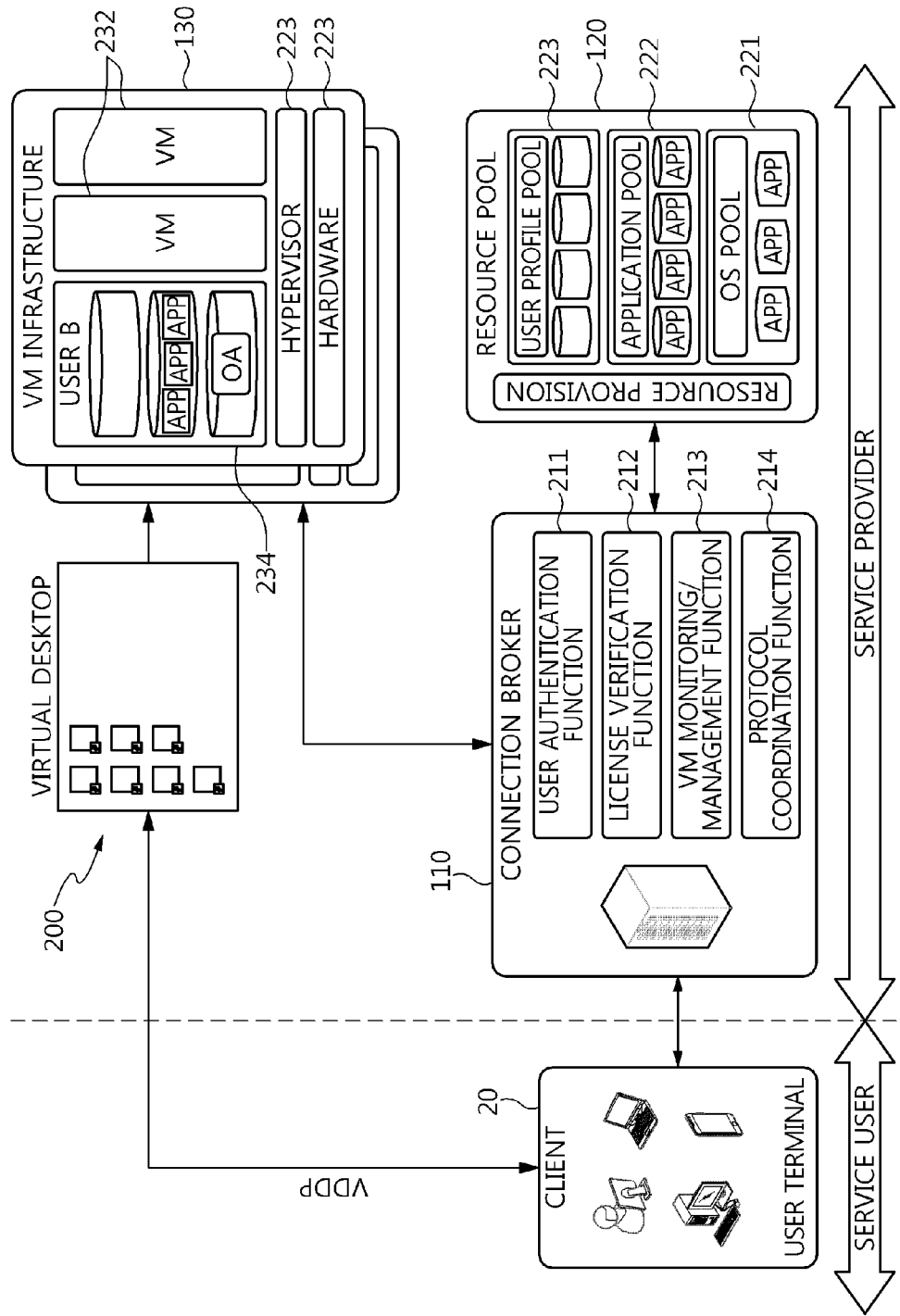
FIG. 2 is a conceptual diagram showing a service architecture for virtual desktop service in accordance with an embodiment of the present invention.

FIG. 2 is a conceptual diagram showing a service architecture for virtual desktop service in accordance with an embodiment of the present invention.

Referring to FIG. 2, the CB 110 may be a software program that enables a user terminal 20 to be connected to a virtual desktop 200. The CB 110 performs a user authentication function 211 and a license verification function 212 for validating the user terminal 20 and the software of the user terminal 20, a function 213 for managing a VM assigned to the user terminal 20 and monitoring a server for measuring the activity level of a VM, and a protocol coordination function 214 for enabling the same protocol to be used between the user terminal 20 and the server.

The CB 110 may provide connection between backup storage and virtual desktop service servers.

Referring to FIG. 2, the resource pool 120 may manage different types of three high-capacity software resources, such as an Operating systems (OS), applications, and user profiles, in order to provide on-demand virtual desktop service. That is, as shown in FIG. 2, the resource pool 120 includes an OS pool 221, an application pool 222, and a user profile pool 223.

The software resources managed by the resource pool 120 are delivered to a specific VM in a streaming form on a specific time and executed on the specific VM.

Furthermore, the resource pool 120 may provide provision information about corresponding software resources in response to a request from the CB 110.

The user profiles may include information about hardware construction (e.g., CPU, RAM, and I/O), an OS used, a selected application, and a user computing environment (e.g., display resolution and an Internet access method), for example. The user profiles may be managed according to each user.

Referring to FIG. 2, the VM infrastructure 130 plays a major role of supporting hardware resources 231 and generating VMs 232.

In a virtualization desktop server, for example, virtualization technology also called a hypervisor 233 is necessary to efficiently manage the hardware resources 231.

The hypervisor 233 abstracts the physical hardware resources 231 and dynamically assigns the abstracted hardware resources 231 to a higher level of software 234.

That is, the hardware resources 231 supported by this VM infrastructure 130 may be efficiently used by a hypervisor virtualization technology in a virtualization desktop server for abstracting the physical hardware resources 231 and dynamically assigning the abstracted hardware resources 231 to a higher level of the software 234.

As a result, the VM infrastructure 130 provides the VMs 232 on which the software 234 of the user terminal 20 operates. Such VMs are called the virtual desktops 200.

A virtual desktop service method is described below with reference to FIG. 3 along with FIG. 2 showing the conceptual diagram of the service architecture for virtual desktop service.

Figure 3:
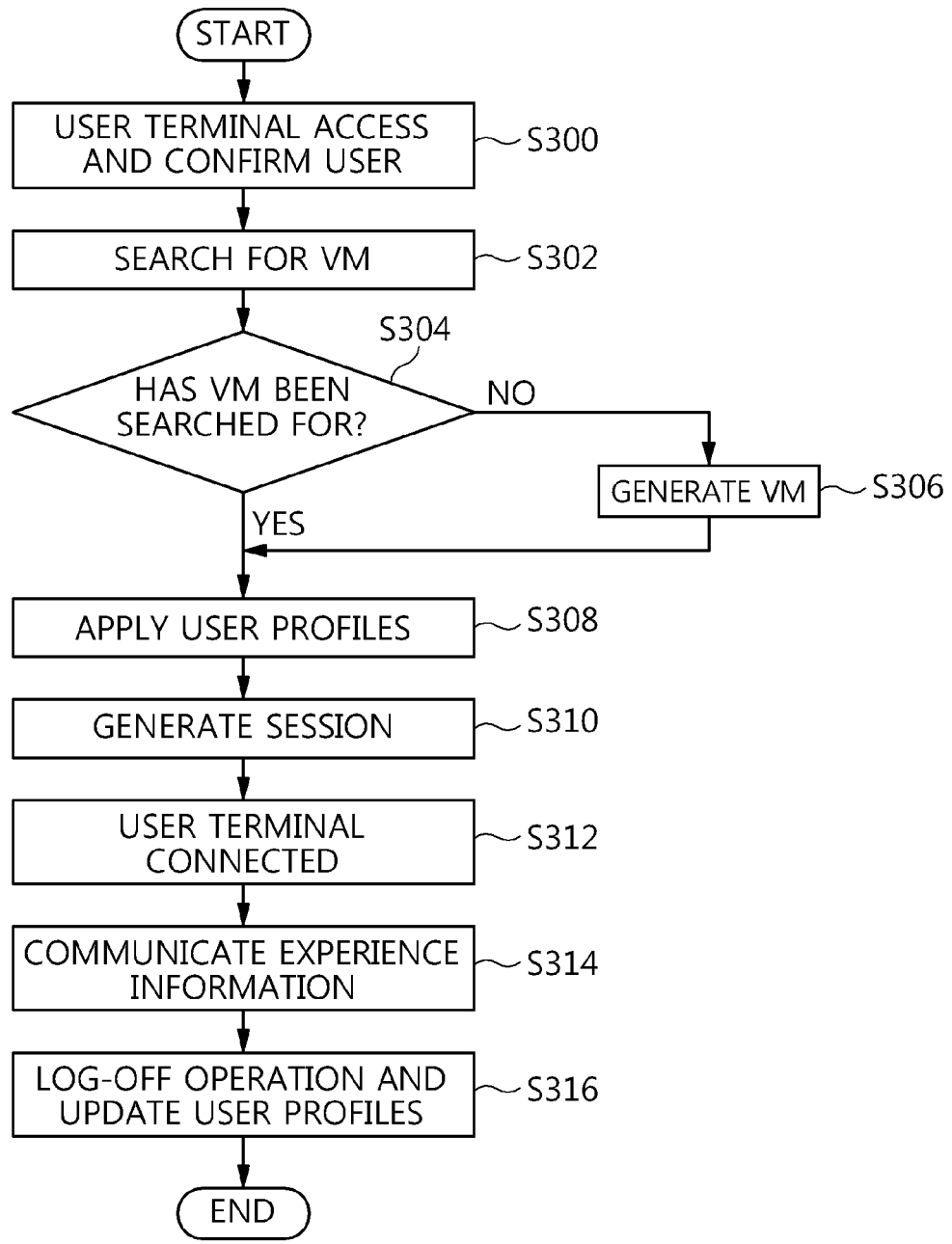
FIG. 3 is a flowchart illustrating a virtual desktop service method in accordance with an embodiment of the present invention.

FIG. 3 is a flowchart illustrating a virtual desktop service method in accordance with an embodiment of the present invention.

Referring to FIG. 3, the virtual desktop service method in accordance with an embodiment of the present invention is performed in accordance with a user terminal access and user validation step S300, a VM search step S302, a user profile application step S308, a session creation step S310, a user terminal connection step S312, an experience information communication step S314, a log-off operation and user profile update step S316, and so on.

In the user terminal access and user validation step S300, when the user terminal 20 accesses the service architecture through one or more security protocols of a Secure SHell (SSH) and Transport Layer Security (TLS), the CB 110 validates the corresponding user based on a user ID and a password.

In the VM search step S302, the CB 110 identifies corresponding user profiles in order to assign a VM and searches for a VM which satisfies the hardware configuration of the user terminal 20 and is optimal for a computing environment using a provisioning function.

Whether or not a VM has been searched for is determined at step S304 based on a result of the search in the VM search step S302. If, as a result of the determination, it is determined that a proper VM is not present, the CB 110 requests the VM infrastructure 130 to generate a VM by sending information about the hardware configuration to the VM infrastructure 130. Accordingly, the VM infrastructure 130 generates the VM at step S306.

In the user profile application step S308, after the VM is assigned or generated, the CB 110 applies the user profiles to the assigned or generated VM.

In the user profile application step S308, the CB 110 may install an OS and application for constructing the virtual desktop 200.

In the session creation step S310, a session for delivering the virtual desktop 200 is generated in the VM infrastructure 130, and session information about the generated session is dispatched to the CB 110.

In the user terminal connection step S312, the CB 110 sends the session information to the user terminal 20, and the user terminal 20 is connected to the VM infrastructure 130.

In the experience information communication step S314, the user terminal 20 communicates pieces of experience information of users through the virtual desktop 200 using a Virtual Desktop Delivery Protocol (VDDP).

In the log-off operation and user profile update step S316, the user terminal 20 executes a log-off operation in order to prevent a loss of user data when virtual desktop service is terminated. During the log-off operation, the CB 110 updates changed user profiles within the user profile pool 223.

In the log-off operation and user profile update step S316, the CB 110 may return a VM so that the VM becomes available.

The functional layers of virtual desktop service in accordance with an embodiment of the present invention are described below with reference to FIGS. 4 and 5.

Figure 4:
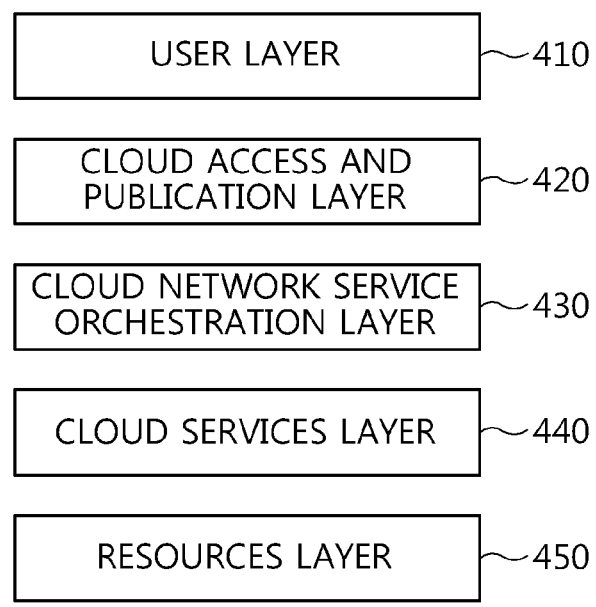
FIG. 4 is a diagram showing a functional layered architecture for virtual desktop service in accordance with an embodiment of the present invention.

FIG. 4 is a diagram showing a functional layered architecture for virtual desktop service in accordance with an embodiment of the present invention.

Referring to FIG. 4, the functional layered architecture for virtual desktop service in accordance with an embodiment of the present invention includes functional layers, such as a user layer 410, a cloud access and publication layer 420, a cloud network service orchestration layer 430, a cloud services layer 440, and a resources layer 450.

The functional layers are described below with reference to FIG. 5.

Figure 5:
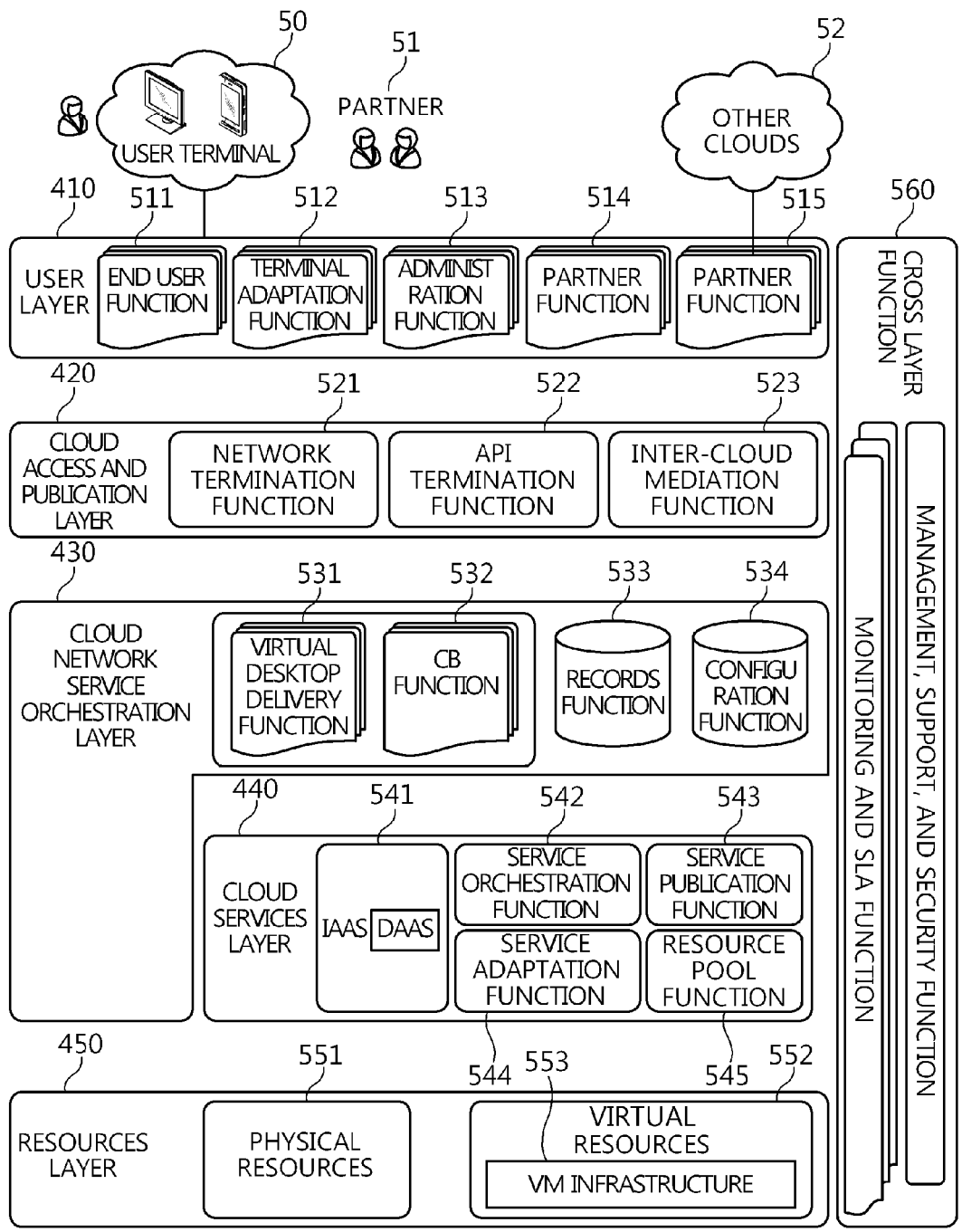
FIG. 5 is a conceptual diagram showing a functional layered architecture for virtual desktop service in accordance with an embodiment of the present invention.

FIG. 5 is a conceptual diagram showing the functional layered architecture for virtual desktop service in accordance with an embodiment of the present invention.

Referring to FIG. 5, the user layer 410 is used to perform an interaction between a user terminal 50 and a cloud infrastructure, send a cloud service request, perform cloud service access, and manage or monitor cloud resources. The user layer 410 includes an end user function 511, a terminal adaptation function 512, an administration function 513, a partner function 514 with partners 51, and an inter-cloud function 515.

When a cloud receives a cloud service request, the cloud orchestrates its own resources or the resources of other clouds through the inter-cloud function 515 and provides cloud service through the user layer 410.

The end user function 511 supports an end user, that is, the user terminal 50, so that the user terminal 50 accesses cloud service and consumes the cloud service.

The administration function 513 supports a company administrator so that the company administrator manages cloud resources and service within a business process.

The partner function 514 enables a partner relation through a cloud service supplier.

The inter-cloud function 515 provides an interconnection interface and a broker function for an interconnection with the clouds of multiple Cloud Service Providers (CSPs). The inter-cloud function 515 includes an inter-cloud service broker function and an inter-cloud portal function.

The inter-cloud broker function provides alternative solutions for cloud users or applications in order to access the cloud service and resources of other CSPs 52.

A user terminal for virtual desktop service may include various types, such as a laptop, a desktop PC, a thin client, and a mobile phone.

The terminal adaptation function means a function that enables a terminal device including different peripherals to provide a proper desktop, of various types of resolution, in another alternative environment.

Referring to FIG. 5, the cloud access and publication layer 420 provides a common interface for manual and automated cloud actions and consumption and accepts a cloud service consumption request from a consumer or business processes using cloud Application Program Interfaces (APIs) for accessing the service and resources of Cloud Service Providers (CSPs). The cloud access and publication layer 420 includes a network termination function 521, an API termination function 522, and an inter-cloud mediation function 523.

Referring to FIG. 5, the cloud network service orchestration layer 430 includes a virtual desktop delivery function 531 and a CB function 532. The virtual desktop delivery function 531 encapsulates and delivers access to the entire information system environment or access to a remote client device over a network. The CB function 532 includes an authentication entity in which a CB provides validated access through a combination of personalized applications for another security level by consulting a directory server in order to authenticate a user desktop session, a coordination entity in which the CB performs a function for enabling a common communication protocol for data and video transmission, of various communication protocols present between the user terminal and the virtual desktop, to be used between a user terminal and a virtual desktop after a user desktop session is authenticated, a monitoring and management entity in which the CB performs the runtime state monitoring of a VM and performs an action for ensuring an operation environment for a necessary application, and a verification entity in which the CB provides a software license verification function so that the user terminal 50 can access a validate application that has been hosted to a virtual desktop.

In the virtual desktop delivery function 531, a Virtual Desktop Delivery Function (VDDP) is a core element of the virtual desktop delivery function 531. The VDDP provides a communication channel between a server for Desktop as a Service (DaaS) and the user terminal 50 in order to deliver all pieces of interaction information, such as display, input, a cursor, control and a construction, and monitoring information.

Furthermore, in the monitoring and management entity, the CB may instruct a VM infrastructure to assign a new idle VM instance in response to a newly arrived request or to assign a previous instance in response to a request made by a client-side device after being recovered from a system failure and may request a VM infrastructure to prepare for a new cloud VM for a new login user session.

The cloud network service orchestration layer 430 further includes a records function 533 and a configuration function 534.

Referring to FIG. 5, the cloud services layer 440 includes a Desktop as a Service (DaaS) function 541 and a resource pool function 545. The DaaS function 541 provides virtual desktop service to the user terminal 50 over a broadband network. The resource pool function 545 is a wide resources repository or repository server set in which a guest OS and applications are serialized and stored. The resource pool function 545 includes a visualized modeling tool for generating a virtual template so that a cloud VM is generated in a VM infrastructure and has a capability to dynamically assemble resources necessary for a virtual desktop being executed and including an OS, application software, user profiles, and a system configuration and to produce a corresponding image file. Furthermore, the resource pool function 545 supports a network-based boot strap protocol which enables communication with a VM infrastructure and also enables a virtual desktop to be remotely generated from a serialized image file.

The cloud services layer 440 may further include a service orchestration function 542, a service publication function 543, and a service adaptation function 544, as shown in FIG. 5.

Referring to FIG. 5, the resources layer 450 includes physical resources 551, including computing resources, repository resources, network resources, power resources, and other essential facilities within a cloud computing environment, and virtual resources 552 including VMs, virtual network resources, and virtual storage resources.

The VM means a virtualization machine that is generated within a VM infrastructure 553 according to other server virtualization technologies, such as XEN and KVM.

Referring back to FIG. 5, the functional layered architecture for virtual desktop service in accordance with an embodiment of the present invention may further provide a cross layer function 560, including a monitoring and SLA function and an administration, support, and security function.

The VM infrastructure 553 means a cluster environment having an HA characteristic. In the VM infrastructure 553, many execution VM instances are generated from the same VM template and configured as the same parameter. Almost all VM infrastructures 553 provide a VM migration capability, and thus an instance being executed can migrate to another hosting server in the case of a system failure in order to maintain business continuity.

Virtual desktop service described in this specification may be service through which a data storage hard disk and applications are provided to an Internet space. That is, virtual desktop service may be desktop service in which actual physical hardware, such as a personal PC or a business desktop, is not used, but a VM is used based on desktop virtualization technology. Here, a generated VM for a desktop may be placed remotely, for example, in an Internet data center and can be used like a local desktop anywhere and anytime Virtual desktop service described in this specification may be Desktop as a Service (DaaS) service, cloud computing service, or cloud desktop service.

The architectures for virtual desktop service (i.e., the service architecture and the functional layered architecture) in accordance with an embodiment of the present invention may be a method of designing a system or server for providing virtual desktop service to a user terminal or may be a system or server itself for providing virtual desktop service to a user terminal.

Figure 6:
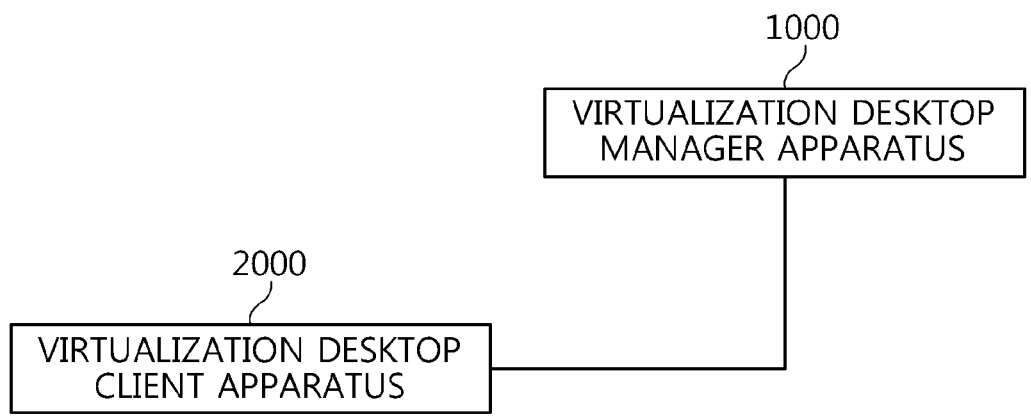
FIG. 6 is a diagram showing the construction of a desktop virtualization system in accordance with an embodiment of the present invention.

FIG. 6 is a diagram showing the construction of a desktop virtualization system in accordance with an embodiment of the present invention.

Referring to FIG. 6, the desktop virtualization system (hereinafter also called a "DaaS system") in accordance with an embodiment of the present invention is configured to include a virtualization desktop manager apparatus 1000 and a virtualization desktop client apparatus 2000.

The virtualization desktop manager apparatus 1000 provides a function for assigning a virtualization desktop server to the virtualization desktop client apparatus 2000 in response to a request from a user and for managing the generation, management, removal, and migration of a VM.

The detailed constructions of the virtualization desktop manager apparatus 1000 and the virtualization desktop client apparatus 2000 are described below with reference to FIGS. 7 and 8.

Figure 7:
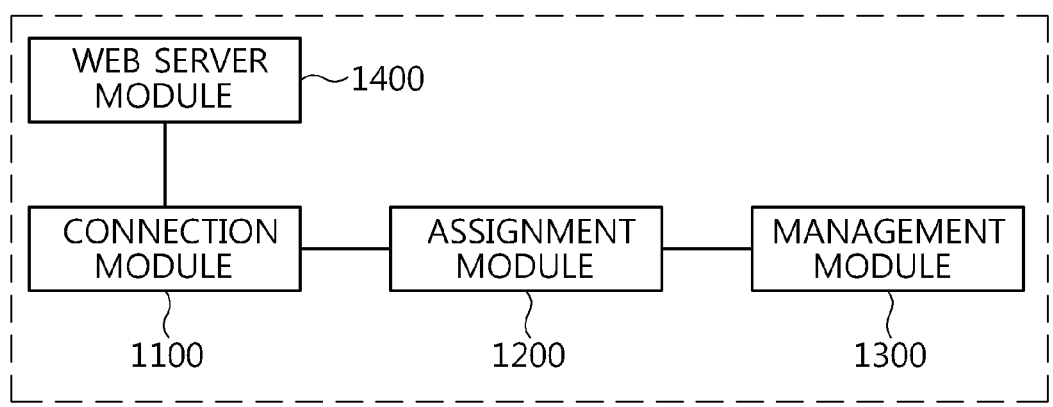
FIG. 7 is a diagram showing a virtualization desktop manager apparatus in accordance with an embodiment of the present invention.

FIG. 7 is a diagram showing the virtualization desktop manager apparatus 1000 in accordance with an embodiment of the present invention.

Referring to FIG. 7, the virtualization desktop manager apparatus 1000 in accordance with an embodiment of the present invention is configured to include a connection module 1100, an assignment module 1200, a management module 1300, and a web server module 1400.

The connection module 1100 permits a user whose user authentication has been completed to connect to the virtualization desktop client apparatus 2000 and a virtualization desktop server.

In order to be remotely provided with virtualization desktop service through the DaaS system, a user accesses the connection module 1100 for connecting the user to a virtualization desktop server.

The connection module 1100 permits a specific VM to be assigned to only a user, connected to the virtualization desktop manager apparatus 1000 based on user authentication, based on information about a request from the user and information about a VM for a virtualization desktop server that constructs a current system.

Furthermore, after assigning a virtualization desktop server, the connection module 1100 may provide a connection function and a screen redirection function for a virtualization desktop environment using the remote access protocol of an assigned VM.

Furthermore, when a user finishes using an assigned VM, the connection module 1100 may store a current environment configuration according to a user account so that the user can perform access again on a desired time, remove the virtualization desktop connection function, and also remove the screen redirection function.

The assignment module 1200 checks the operating state of a virtualization desktop server and assigns an optimum virtualization desktop server to the virtualization desktop client apparatus 2000.

In order to assign a VM, supporting the best virtualization desktop service, to a remote user that requests virtualization desktop service through the connection module 1100, the assignment module 1200 may provide a VM provisioning function for monitoring information about resources used by virtualization desktop servers and about the assignment of VMs in real time.

The assignment module 1200 may monitor the resource assignment state of virtualization desktop servers that form a DaaS system, information about resources used by the virtualization desktop servers, and information about whether generated VMs are used or not in real time.

The assignment module 1200 provides the best user-tailored virtualization desktop server to a remote user and may assign another VM to a remote user in real time when a problem occurs in an assigned VM.

The assignment module 1200 may separate an image for the operation of a VM and a disk image for the user of the virtualization desktop client apparatus 2000 and assign a virtualization desktop server.

The management module 1300 monitors the operating state of a virtualization desktop server and a VM and performs the control command of a virtualization desktop server.

The web server module 1400 provides a user with a management tool GUI based on a web.

Figure 8:
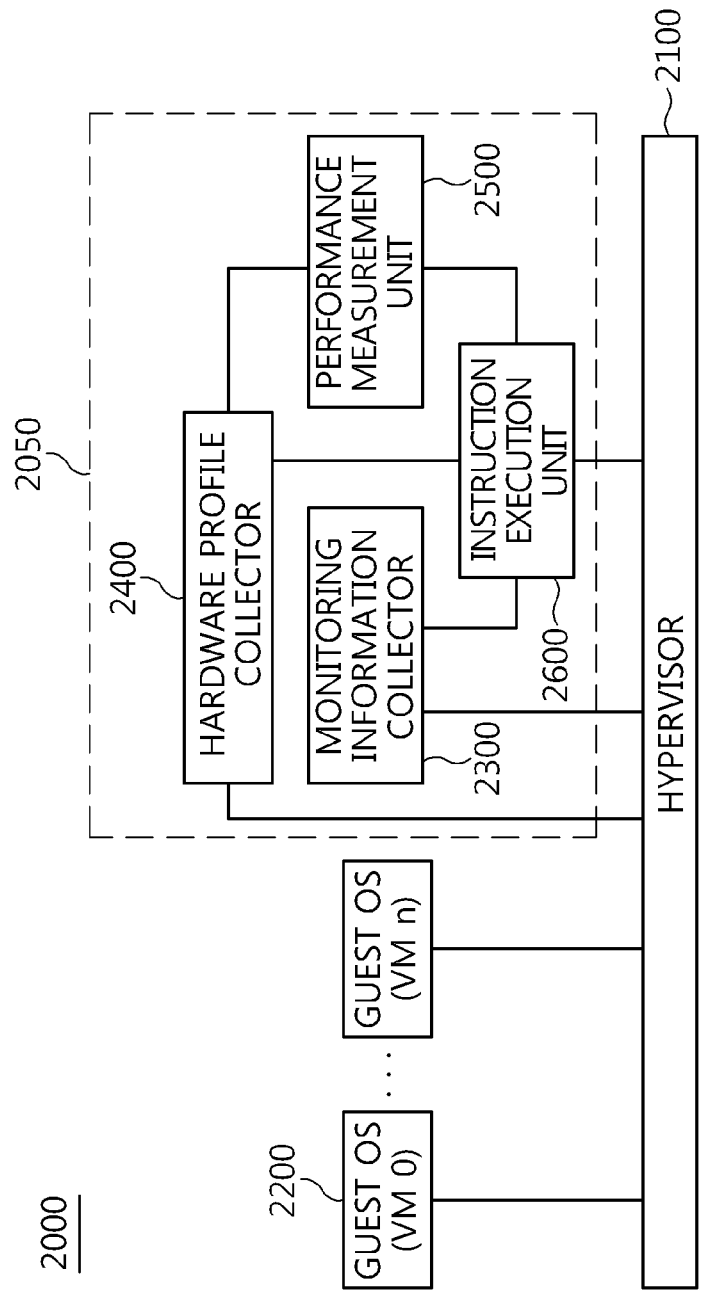
FIG. 8 is a diagram showing a virtualization desktop client apparatus in accordance with an embodiment of the present invention.

FIG. 8 is a diagram showing the virtualization desktop client apparatus 2000 in accordance with an embodiment of the present invention.

Referring to FIG. 8, the virtualization desktop client apparatus 2000 in accordance with an embodiment of the present invention is configured to include a hypervisor 2100, a monitoring information collector 2300, a hardware profile collector 2400, a performance measurement unit 2500, and an instruction execution unit 2600.

The monitoring information collector 2300, the hardware profile collector 2400, the performance measurement unit 2500, and the instruction execution unit 2600 may form a virtualization desktop agent 2050.

The hypervisor 2100 accommodates one or more VMs 2200 over hardware.

The hypervisor 2100 can communicate with the elements of the VM 2200 and the virtualization desktop agent 2050 using a programmed daemon.

The type of VM 2200 may have a full-virtualization or semi-virtualization form.

The monitoring information collector 2300 monitors the VM 2200.

The hardware profile collector 2400 collects information about the hardware and OS level of the virtualization desktop client apparatus 2000.

The performance measurement unit 2500 computes information about the performance of the VM 2200 based on information monitored by the monitoring information collector 2300.

The instruction execution unit 2600 buffers and executes a control command received from a virtualization server.

A control command related to control of a VM may be controlled through a programmed daemon, and a command related to the virtualization desktop client apparatus 2000 may be processed by the hypervisor 2100 and an OS level.

A TCP/UDP is used as the network protocol of a virtualization desktop system, and a driving method in terms of management is described in detail below with reference to FIGS. 9 and 10.

Figure 9:
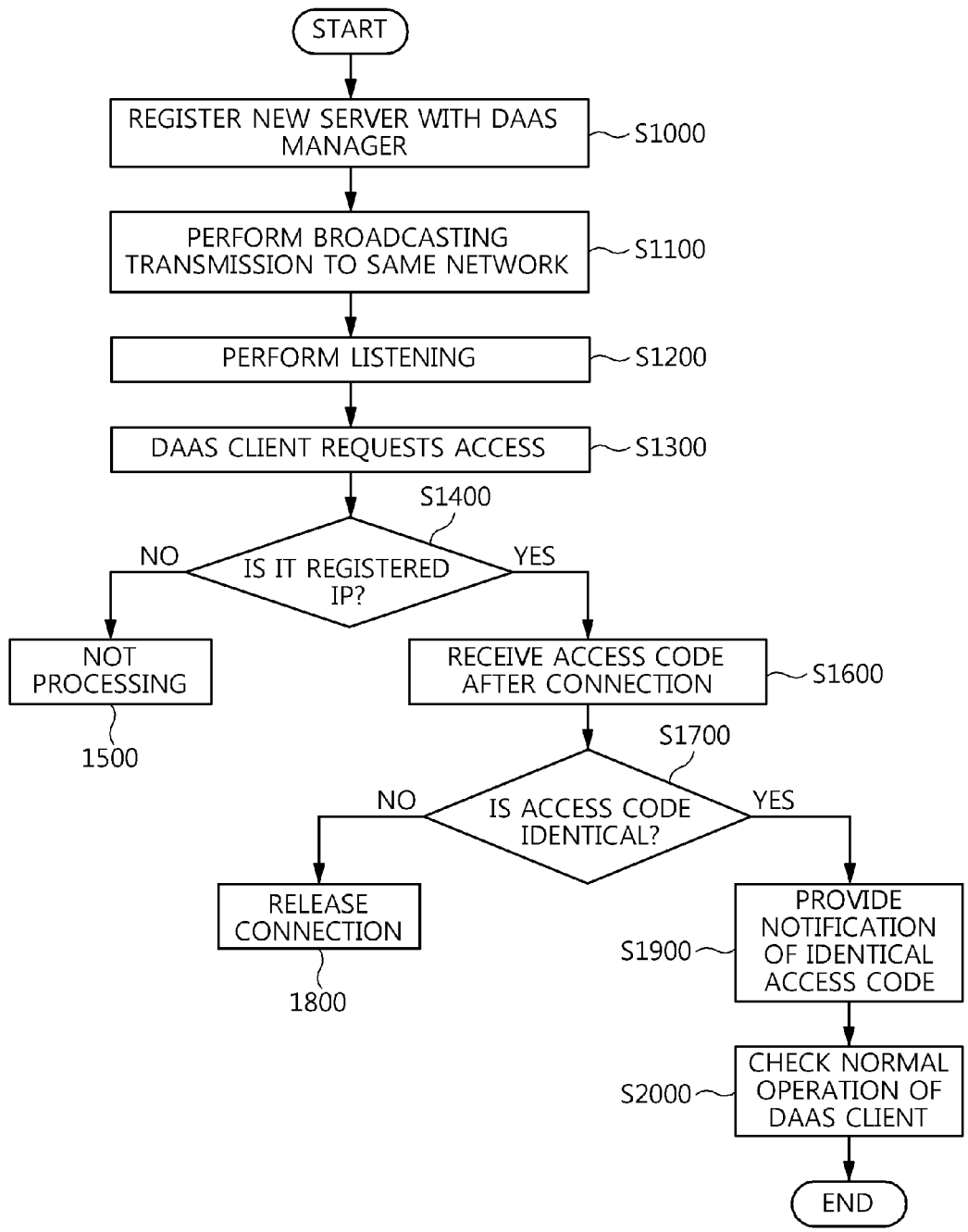
FIG. 9 is a flowchart illustrating a management method through the virtualization desktop manager apparatus in accordance with an embodiment of the present invention.

FIG. 9 is a flowchart illustrating a management method through the virtualization desktop manager apparatus in accordance with an embodiment of the present invention.

Referring to FIG. 9, in the management method through the virtualization desktop manager apparatus in accordance with an embodiment of the present invention, first, a user registers a new server with the virtualization desktop manager apparatus 1000 at step S1000.

A method of registering a new server is described below. First, the user attempts access to the virtualization desktop client apparatus 2000. If the user is a new user, the user accesses the connection module 1100. Thereafter, the user is assigned a member ID and a password in accordance with a member subscription procedure. The user accesses the virtualization desktop manager apparatus 1000 using the assigned access ID, and the virtualization desktop manager apparatus 1000 generates a new image. In the case of a new image, the virtualization desktop manager apparatus 1000 selects a preset virtualization image suitable for an existing user pattern as the new image or generates the new image by configuring a CPU, memory, and a HDD desired by the user. After the image is generated, information is owned by the connection module 1100. The connection module 1100 requests the redirection function from the management module 1300 based on the image generated for service, and subsequent direction management continues to be performed by the management module 1300.

Thereafter, the virtualization desktop manager apparatus 1000 sends the IP and access port of the virtualization desktop manager apparatus 1000 to all servers that have been registered with the same network according to a broadcast method at step S1100.

In order to send the IP of a server of the virtualization desktop manager apparatus 1000 without a change of registered client apparatus when changing the IP of the server, the IP and access port of the virtualization desktop manager apparatus 1000 may be transmitted and retransmitted once at a specific interval if there is no access by a new server.

Thereafter, the virtualization desktop manager apparatus 1000 operates as a TCP server and performs listening to a broadcast port at step S1200.

Thereafter, when a connection request message (i.e., TCP connection) is received from the virtualization desktop client apparatus 2000 at step S1300, whether or not a corresponding client apparatus is the IP of a client apparatus registered with an administration server is verified at step S1400.

If, as a result of the verification, the corresponding client apparatus is found to be the IP of a non-registered client apparatus, the TCP connection is not processed at step S1500.

If, as a result of the verification, the corresponding client apparatus is found to be the IP of a registered client apparatus, access code is received from the client apparatus at step S1600.

The access code may be configured to be modified through the GUI of the virtualization desktop manager apparatus.

Thereafter, the access code received from the client apparatus is compared with access code transmitted by the virtualization desktop client apparatus 2000 at step S1700. Information about a result of the comparison is transmitted to the client apparatus that has attempted access.

The information about a result of the comparison may be transmitted as a result value of 1 if the access code received from the client apparatus is identical with the access code transmitted by the virtualization desktop client apparatus and may be transmitted as a result value of 0 if the access code received from the client apparatus is not identical with the access code transmitted by the virtualization desktop client apparatus.

If, as a result of the comparison, the access code received from the client apparatus is found to be not identical with the access code transmitted by the virtualization desktop client apparatus, the result value of 0 is transmitted and the corresponding connection is released at step S1800.

In contrast, if, as a result of the comparison, the access code received from the client apparatus is found to be identical with the access code transmitted by the virtualization desktop client apparatus, such a result is notified at step S1900, and whether or not the virtualization desktop agent of the virtualization desktop client apparatus normally operates is checked at step S2000.

Here, whether or not an accessed virtualization desktop agent continues to be connected may be checked through an additional thread or process.

Here, the virtualization desktop agent may continue to be connected using the keepalive function of a TCP although data is not transmitted.

Figure 10:
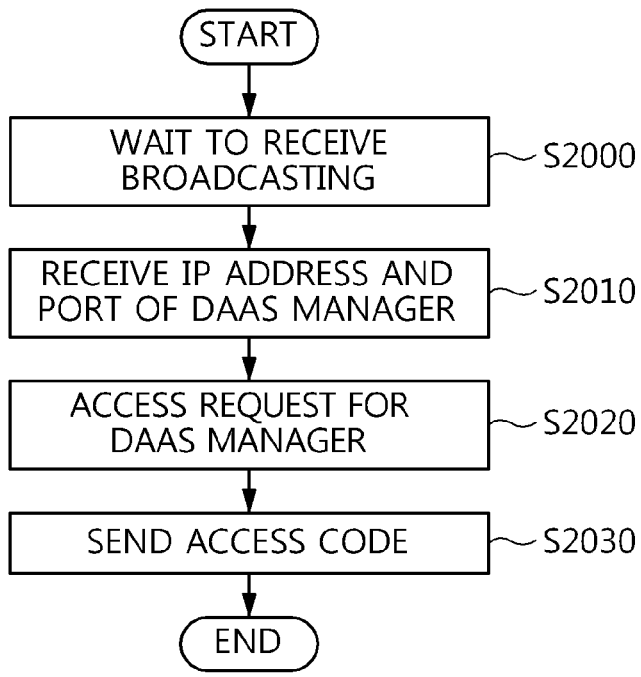
FIG. 10 is a flowchart illustrating a management method through the virtualization desktop client apparatus in accordance with an embodiment of the present invention.

FIG. 10 is a flowchart illustrating a management method through the virtualization desktop client apparatus in accordance with an embodiment of the present invention.

Referring to FIG. 10, in the management method through the virtualization desktop client apparatus in accordance with an embodiment of the present invention, first, in order to access the virtualization desktop manager apparatus 1000, the virtualization desktop agent waits to receive information about an IP and port from the virtualization desktop manager apparatus 1000 when it is first driven at step S3000.

When the virtualization desktop agent is driven, broadcast receiver code is first performed. If TCP connection is broken while the virtualization desktop agent is driven after the TCP connection, the virtualization desktop agent may be configured so that the broadcast receiver code portion is performed again.

Thereafter, the virtualization desktop agent receives the IP address and port of the virtualization desktop manager apparatus 1000 through broadcasting at step S3010 and requests access from the virtualization desktop manager apparatus 1000 using the received IP address and port at step S3020.

Thereafter, when connection is completed, the virtualization desktop agent sends access code to the virtualization desktop manager apparatus 1000 at step S3030.

The access code may be stored as an additional file.

Thereafter, the virtualization desktop agent waits for the results of the processed access code. If an access error occurs, the virtualization desktop agent performs the broadcast receiver code again because the connection is broken.

Figure 11:
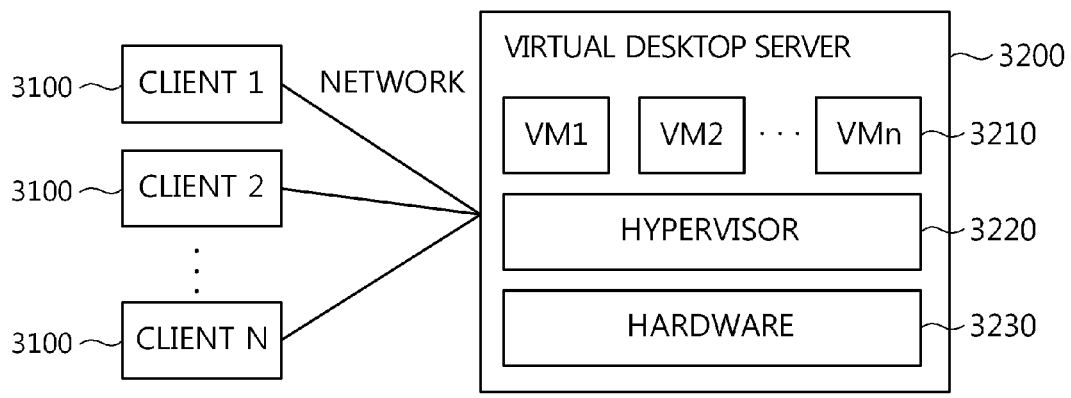
FIG. 11 is a diagram showing the general structure of a virtual desktop service system.

FIG. 11 is a diagram showing the general structure of a virtual desktop service system.

Referring to FIG. 11, the virtual desktop service system in accordance with an embodiment of the present invention includes a virtualization desktop server 3200 and a plurality of client systems 3100. The virtualization desktop server 3200 and the plurality of client systems 3100 are connected over a network.

A hypervisor 3220 is installed in the virtualization desktop server 3200. Virtual machines 3210 for virtual desktop service are executed on the hypervisor 3220. Furthermore, a user accesses the VM 3210 on the virtualization desktop server 3200 using the client system 3100. The VM 3210 is actually executed on the virtualization desktop server 3200, and only a user input and output task is executed on the client system 3100.

Figure 12:
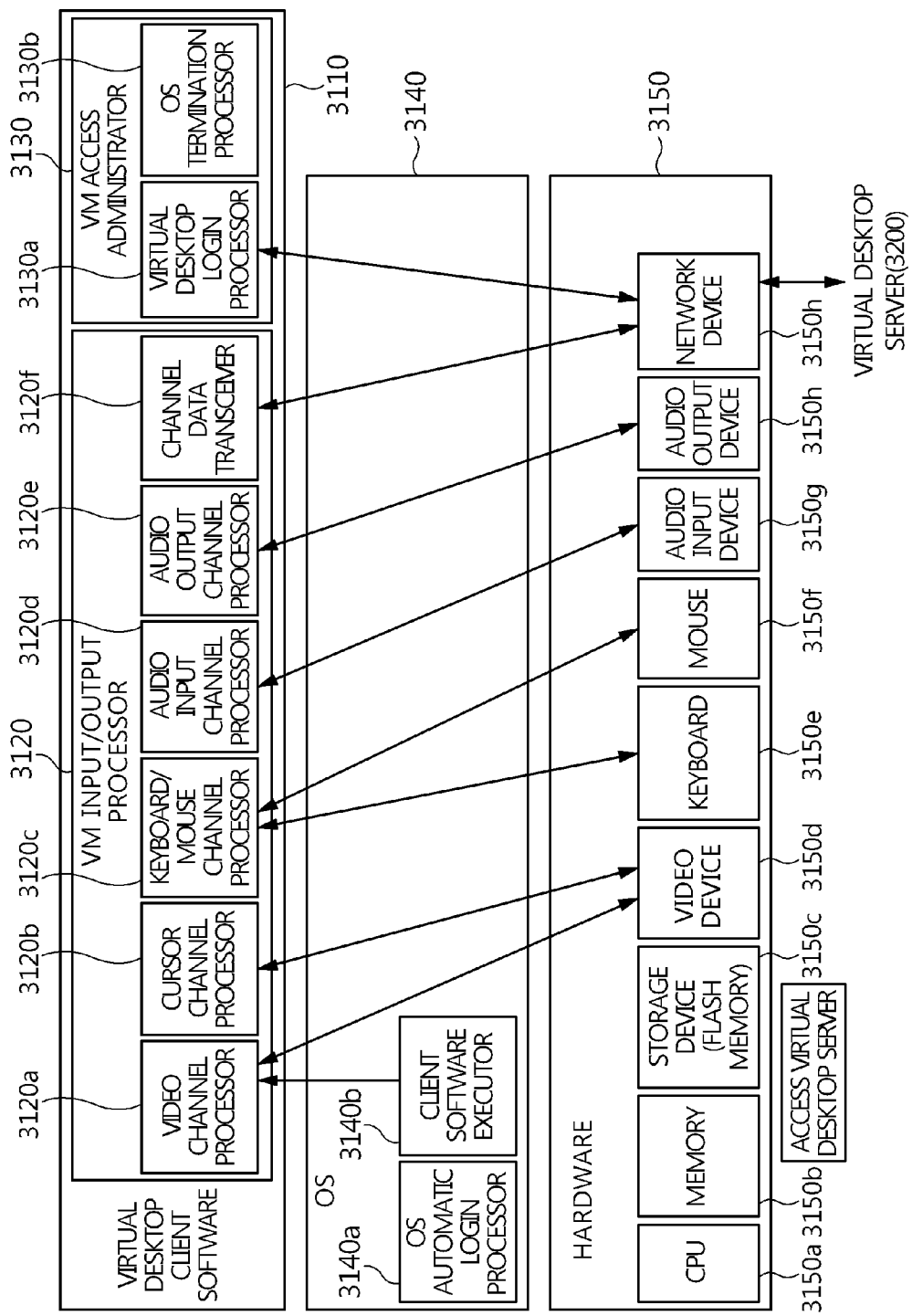
FIG. 12 is a diagram showing the general structure of a client system in accordance with an embodiment of the present invention.

FIG. 12 is a diagram showing the general structure of the client system in accordance with an embodiment of the present invention.

Referring to FIG. 12, the hardware 3150 of the client system 3100 includes a CPU 3150*a*, memory 3150*b*, a storage device 3150*c*, a video device 3150*d*, a keyboard 3150*e*, a mouse 3150*f*, an audio input device 3150*g*, an audio output device 3150*h*, and a network device 3150*i*.

A client OS 3140 and virtual desktop client software 3110 are mounted on the storage device 3150*c*, and the storage device 3150*c* has a minimum capacity capable of storing the client OS 3140 and the virtual desktop client software 3110.

Furthermore, the OS 3140 manages the hardware 3150 of the client system and provides an environment in which the client software 3110 is executed.

The client software 3110 includes a VM input/output processor 3120 and a VM access administrator 3130.

The VM input/output processor 3120 includes a video channel processor 3120*a*, a cursor channel processor 3120*b*, a keyboard/mouse channel processor 3120*c*, an audio input channel processor 3120*d*, an audio output channel processor 3120*e*, and a channel data transceiver 3120*f*.

Furthermore, the VM access administrator 3130 includes a virtual desktop login processor 3130*a* and an OS termination processor 3130*b*.

Figure 13:
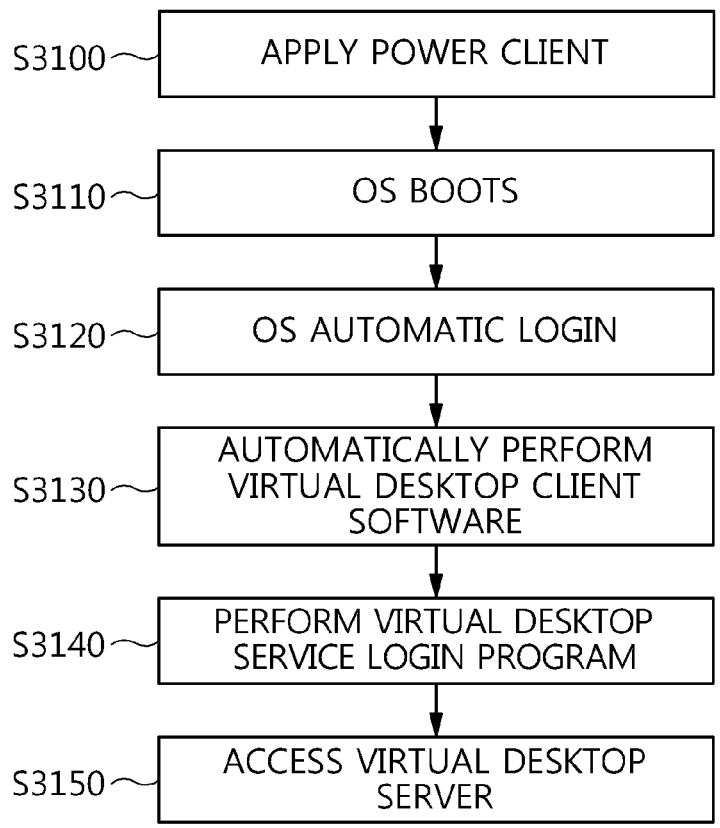
FIG. 13 is a flowchart illustrating a process of accessing, by the client system, virtual desktop service in accordance with an embodiment of the present invention.

FIG. 13 is a flowchart illustrating a process of accessing, by the client system, virtual desktop service in accordance with an embodiment of the present invention.

Referring to FIG. 13, when power is applied to the client system 3100, the OS 3140 which manages clients is executed at step S3100. When the OS 3140 is booted up at step S3110, the login of the OS 3140 is automatically executed by the OS automatic login processor 3140*a* at step S3120.

Thereafter, the client software executor 3140b of the OS 3140 automatically executes the virtual desktop client software 3110 at step S3130. When the virtual desktop client software 3110 is executed, the virtual desktop login processor 3130a is executed at step S3140.

In order to access the virtualization desktop server 3200, the virtual desktop login processor 3130a needs to be aware of the ID and password of the VM 3210 and the IP address of the virtualization desktop server 3200. The virtual desktop login processor 3130a performs login using the ID and password of the VM 3210 and the IP address of the virtualization desktop server 3200. If the login is successful, the virtual desktop login processor 3130a may access and use a corresponding VM 3210 at step S3150.

The virtual desktop login processor 3130a may use one of two methods using a login screen and using the storage device 3150c of the client system 3100 as a method of receiving the ID and password of the VM 3210 and the IP address of the virtualization desktop server 3200.

Figure 14:
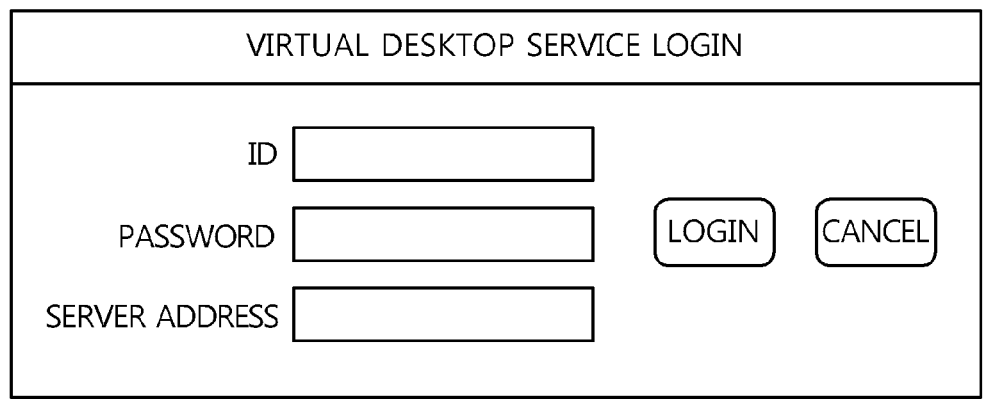
FIG. 14 is a diagram showing a login screen in the client system.

FIG. 14 is a diagram showing a login screen in the client system.

In accordance with an embodiment of the present invention, as shown in FIG. 14, the virtual desktop login processor 3130a may receive the ID and password of the VM 3210 and the IP address of the virtualization desktop server 3200 using a login screen and perform login using the ID and password of the VM 3210 and the IP address of the virtualization desktop server 3200.

Alternatively, in accordance with an embodiment of the present invention, the virtual desktop login processor 3130a may store the ID and password of the VM 3210 and the IP address of the virtualization desktop server 3200 in the client storage device 3150c and automatically fetch them from a corresponding file. In such a case, the virtual desktop login processor 3130a may directly access the VM 3210 without using a login screen.

Figure 15:
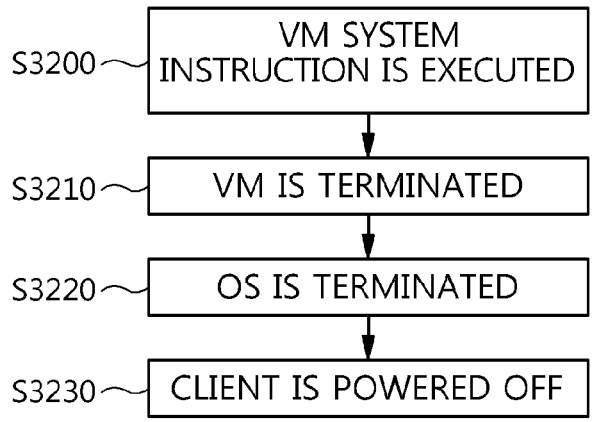
FIG. 15 is a flowchart illustrating a process of the client system being terminated in accordance with an embodiment of the present invention.

FIG. 15 is a flowchart illustrating a process of the client system being terminated in accordance with an embodiment of the present invention.

Referring to FIG. 15, a user executes the system termination instruction of the VM 3210 at step S3200. In response thereto, the VM 3210 of the virtualization desktop server 3200 is terminated at step S3210.

Thereafter, the OS termination processor 3130b of the virtual desktop client software 3110 recognizes that the VM 3210 has been terminated and instructs the client system 3100 to be terminated.

In response to the instruction, the OS 3140 of the client system 3100 is terminated at step S3220 and the client system 3100 is also powered off at step S3230.

Data between the VM 3210 of the virtualization desktop server 3200 and the client system 3100 is exchanged through the following channels.

A video channel transmits a screen on the monitor from the VM 3210 to the client system 3100. A cursor channel transmits a mouse cursor displayed on a screen of the monitor from the VM 3210 to the client system 3100.

Furthermore, a keyboard/mouse channel sends the keyboard/mouse input of the client system 3100 to the VM 3210.

Furthermore, an audio input channel sends the audio input of the client system 3100 to the VM 3210, and an audio output channel sends the audio output of the VM 3210 to the client system 3100.

Furthermore, the channel data transceiver 3120f includes a channel data transmitter and a channel data receiver.

The virtualization desktop server 3200 sends data corresponding to the channels of the VM 3210 to the client system 3100. The data of the VM 3210 arrives at the client system 3100 through the channel data receiver of the client system 3100, and the client system 3100 sends the data to corresponding channel processors.

The video channel processor 3120a outputs a screen on the monitor using the video device 3150d, and the cursor channel processor 3120b outputs a mouse cursor to a designated position on the monitor.

Furthermore, the audio output channel processor 3120e outputs audio using the audio output device 3150h, and the channel data transmitter 3120f sends the input data of the client system 3100 to the VM 3210.

The keyboard/mouse channel processor 3120c sends the keyboard/mouse input of the client system 3100 to the VM 3210 through the channel data transmitter 3120f.

Furthermore, the audio input channel processor 3120d sends data, received from the audio input device 3150g, to the VM 3210 through the channel data transmitter 3120f.

As described above, according to the present invention, the client system 3100 can access virtual desktop service right after it is powered on, and the client system 3100 is also powered off when the VM 3210 of the virtual desktop service is terminated. Accordingly, the present invention provides an environment in which users can be provided with VM service without a need to be aware of the OS 3140 and the virtual desktop client software 3110 for driving the client system 3100.

Accordingly, according to the present invention, there is no problem in that a user has to directly execute dedicated software because a VM is connected to virtual desktop service right after the client system is powered on through the structure of a dedicated client for the virtual desktop service.

Furthermore, according to the present invention, a user can use virtual desktop service without a need to recognize the client OS and the client software because the client system is also powered off when a VM is terminated.

An embodiment of the CB capable of performing the load balancing function for dynamically assigning virtual desktop service is described in detail below.

Figure 16:
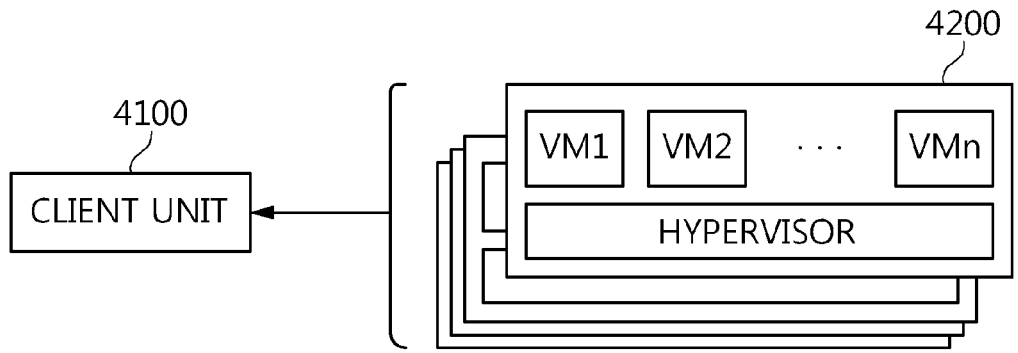
FIG. 16 is a diagram showing the configuration of a system for real-time virtual desktop service in accordance with an embodiment of the present invention.

FIG. 16 is a diagram showing the configuration of a system for real-time virtual desktop service in accordance with an embodiment of the present invention.

Referring to FIG. 16, the system for real-time virtual desktop service in accordance with an embodiment of the present invention is configured to include a client unit 4100 and a service provider server 4200.

The client unit 4100 requests the service provider server 4200 to assign a VM and is provided with VM service through an assigned VM.

The service provider server 4200 permits a user to access VMs, generated on the hypervisor, through the client unit 4100 using an access protocol and permits the user to use its own VM stored in the service provider server 4200.

In order to provide the user with the VM, user profiles (i.e., a user information file), an OS image for the user, and a disk image for the user are necessary.

Figure 17:
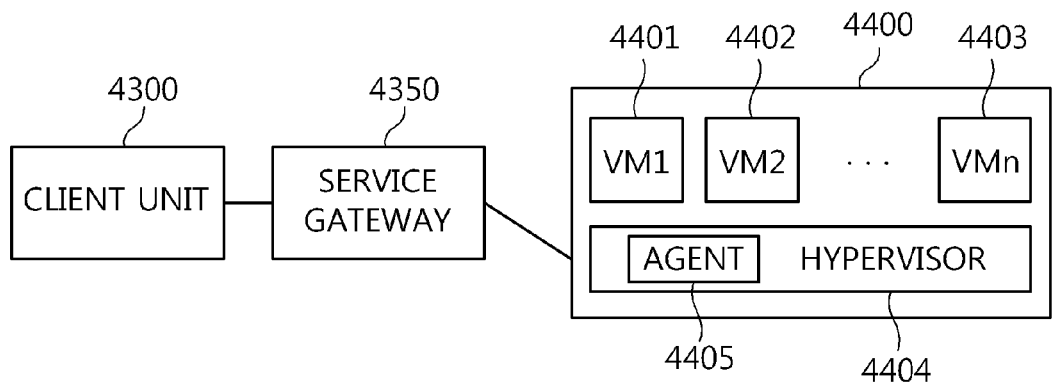
FIG. 17 is a diagram showing the configuration of a system for virtual desktop service including a service gateway in accordance with an embodiment of the present invention.

FIG. 17 is a diagram showing the configuration of a system for virtual desktop service including a service gateway in accordance with an embodiment of the present invention.

Referring to FIG. 17, the system for virtual desktop service including a service gateway in accordance with an embodiment of the present invention is configured to include a client unit 4300, a service gateway 4350, and a service provider server 4400.

The client unit 4300 delivers an instruction that requests to assign and use a VM to the service provider server 4400 through the service gateway 4350.

The service gateway 4350 authenticates the user of the client unit 4300 and performs a permission procedure regarding whether or not to assign task rights to the user.

The service gateway 4350 is described in detail later with reference to FIG. 18.

The service provider server 4400 is configured to include a plurality of VMs 4401, 4402, and 4403 and a hypervisor 4404.

The hypervisor 4404 further includes an agent 4405 for executing the request instruction received from the client unit 4300 and delivering the results of the execution to the client unit 4300 through the service gateway 4350.

Figure 18:
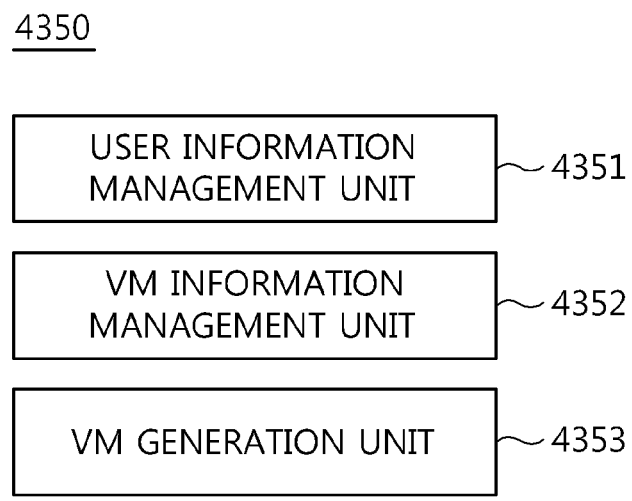
FIG. 18 is a diagram showing the construction of the service gateway for real-time virtual desktop service in accordance with an embodiment of the present invention.

FIG. 18 is a diagram showing the construction of the service gateway for real-time virtual desktop service in accordance with an embodiment of the present invention.

Referring to FIG. 18, the service gateway 4350 for real-time virtual desktop service in accordance with an embodiment of the present invention is configured to include a user information management unit 4351, a VM information management unit 4352, and a VM generation unit 4353.

The user information management unit 4351 authenticates user information provided by a user through the client unit 4300.

The user information management unit 4351 may determine whether or not the user is a registered user by analyzing the user information provided by the client unit 4300.

The VM information management unit 4352 generates VM access information, corresponding to the user information provided by the client unit 4300, and provides the generated VM access information to the client unit 4300.

Here, the access information may include the address and port number of the service provider server 4400 that provides a VM.

If the user is determined to be a registered user based on the user information analyzed by the user information management unit 4351, the VM information management unit 4352 may determine whether or not an already generated VM is present.

In contrast, if the user is determined to be a non-registered user based on the user information analyzed by the user information management unit 4351, the VM information management unit 4352 may generate a new user by requesting the client unit 4300 to register a user ID, a password, and VM configuration information.

The VM configuration information may include one or more of pieces of information about the number of CPUs, the number of pieces of memory, the hard disk capacity, and the type of OS of a VM to be provided.

The VM configuration information may include preset information generated by the VM information management unit 4352 by analyzing a right level of user information and determining the domain name and the type of OS of a VM based on the analyzed right level.

If an already generated VM corresponding to the user information is not present, the VM information management unit 4352 may request the client unit 4300 to register the VM configuration information.

In response to a request to generate a VM from the client unit 4300, the VM generation unit 4353 selects a service provider server and generates a VM in the selected service provider server.

Figure 19:
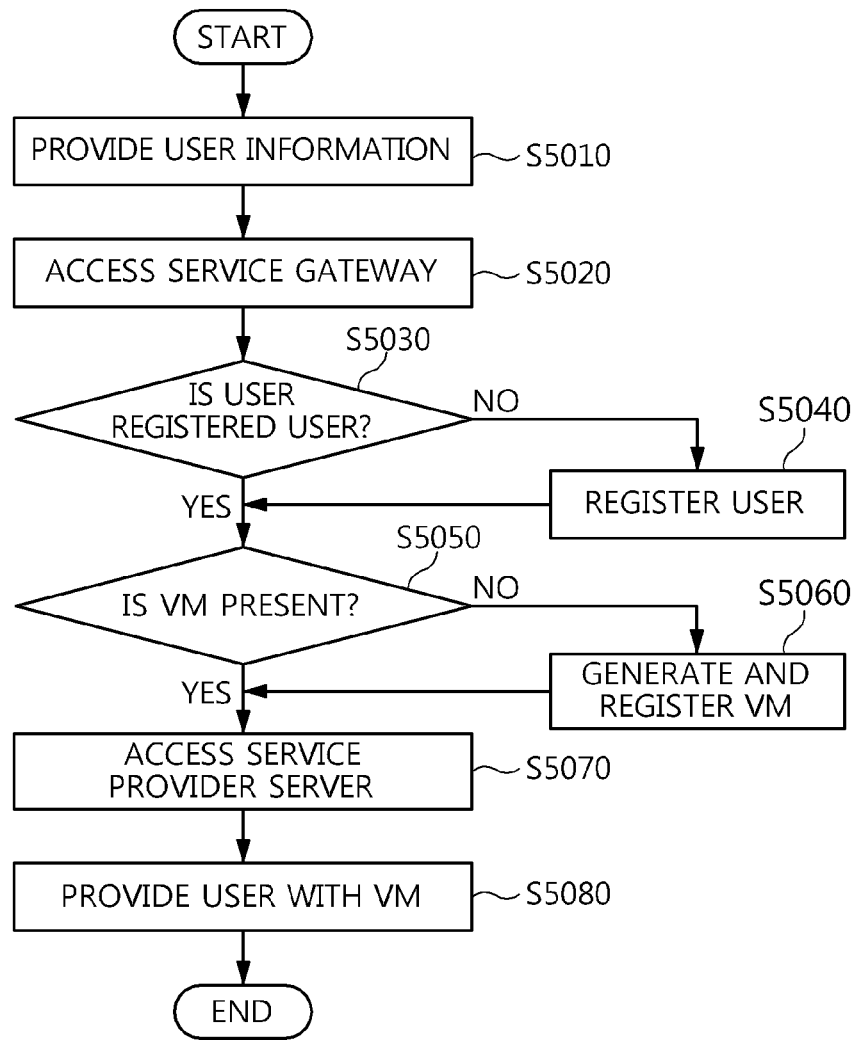
FIG. 19 is a diagram showing a VM providing method for real-time virtual desktop service in accordance with an embodiment of the present invention.

FIG. 19 is a diagram showing a VM providing method for real-time virtual desktop service in accordance with an embodiment of the present invention.

Furthermore, FIGS. 20 to 23 are diagrams showing a process of the VM providing method for real-time virtual desktop service in accordance with an embodiment of the present invention in an interface form.

Referring to FIG. 19, in the VM providing method for real-time virtual desktop service in accordance with an embodiment of the present invention, first, the client unit attempts access by delivering user information to the service gateway at steps S5010 and S5020.

The client unit may be a PC or a mobile device.

Figure 20:
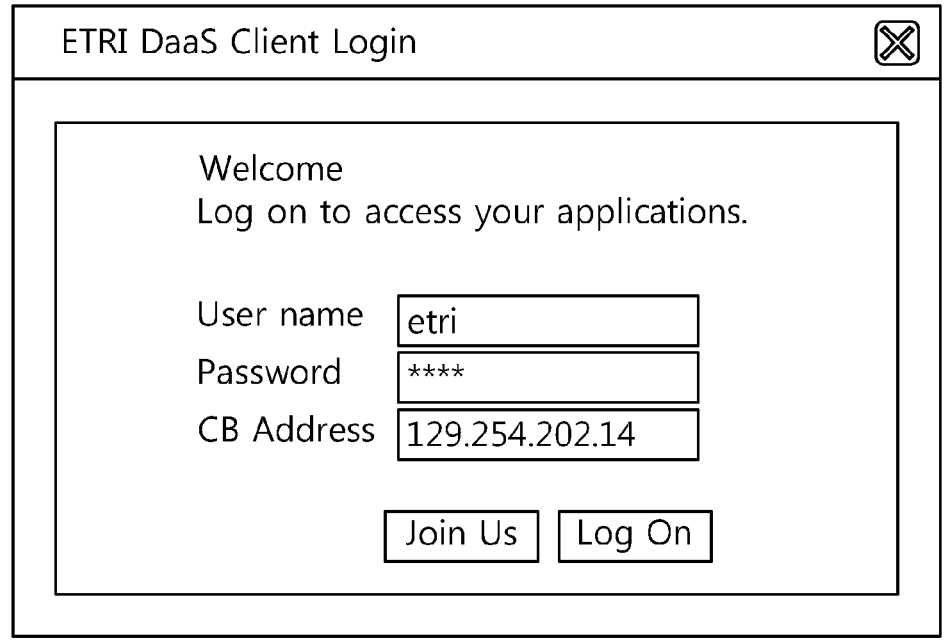
FIG. 20 is a diagram showing an interface for the VM providing method for real-time virtual desktop service in accordance with an embodiment of the present invention.

Steps S5010 and S5020 are described in detail below with reference to FIG. 20. A user inputs user information, corresponding to a user name and password, and the address of a CB, that is, the on-line address of the service gateway, to an access interface screen outputted to a PC or a mobile device.

The client unit attempts access to an on-line server corresponding to the address of the CB and at the same time delivers the user name and password to the on-line server.

Thereafter, the service gateway determines whether or not the user is a registered user by analyzing the user information at step S5030.

If, as a result of the determination, it is determined that the user is a non-registered user, the service gateway requests the client unit to register a user ID, a password, and VM configuration information and generates a new user at step S5040.

Figure 21:
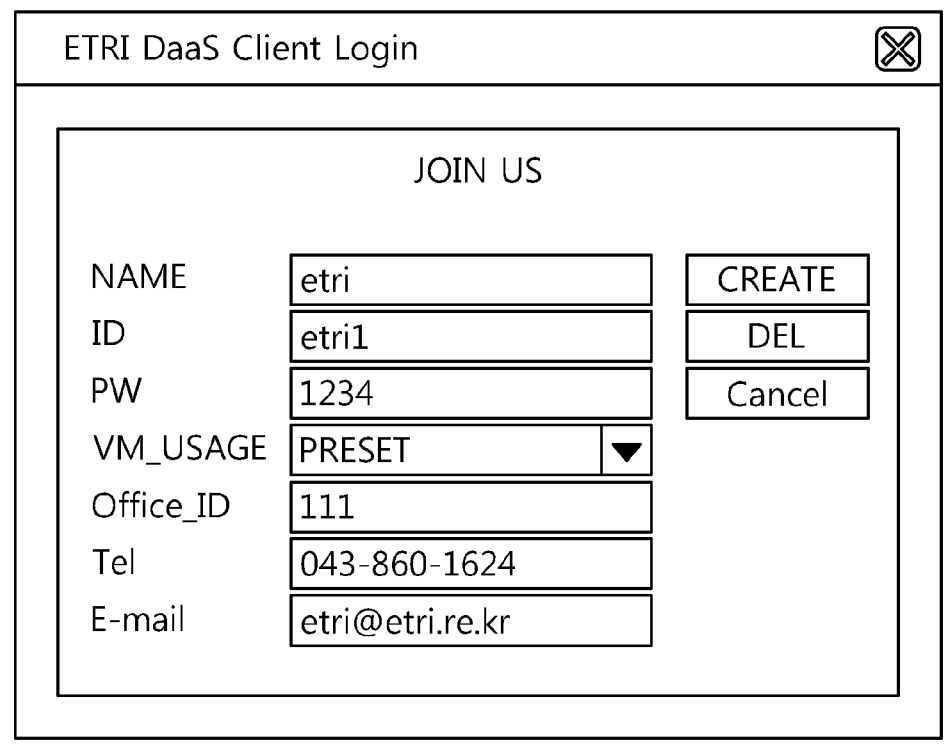
FIG. 21 is a diagram showing an interface for the VM providing method for real-time virtual desktop service in accordance with an embodiment of the present invention.

Step S5040 is described in detail below with reference to FIG. 21. In order to register a user, the client unit inputs a name, an ID, a password PW, VM configuration information VM_USAGE, an office name Office_ID, a telephone number Tel, and an e-mail address to a registration interface screen, and the service gateway generates a new user.

A process of setting the VM configuration information is described later with reference to FIGS. 22 and 23.

Thereafter, the service gateway determines whether or not an already generated VM corresponding to the user information is present at step S5050.

If, as a result of the determination, it is determined that an already generated VM is not present, the service gateway requests the client unit to register VM configuration information, generates a new VM based on the registered VM configuration information, and registers the generated new VM at step S5060.

A preset method and a manual method may be used as a method of setting the VM configuration information.

Figure 22:
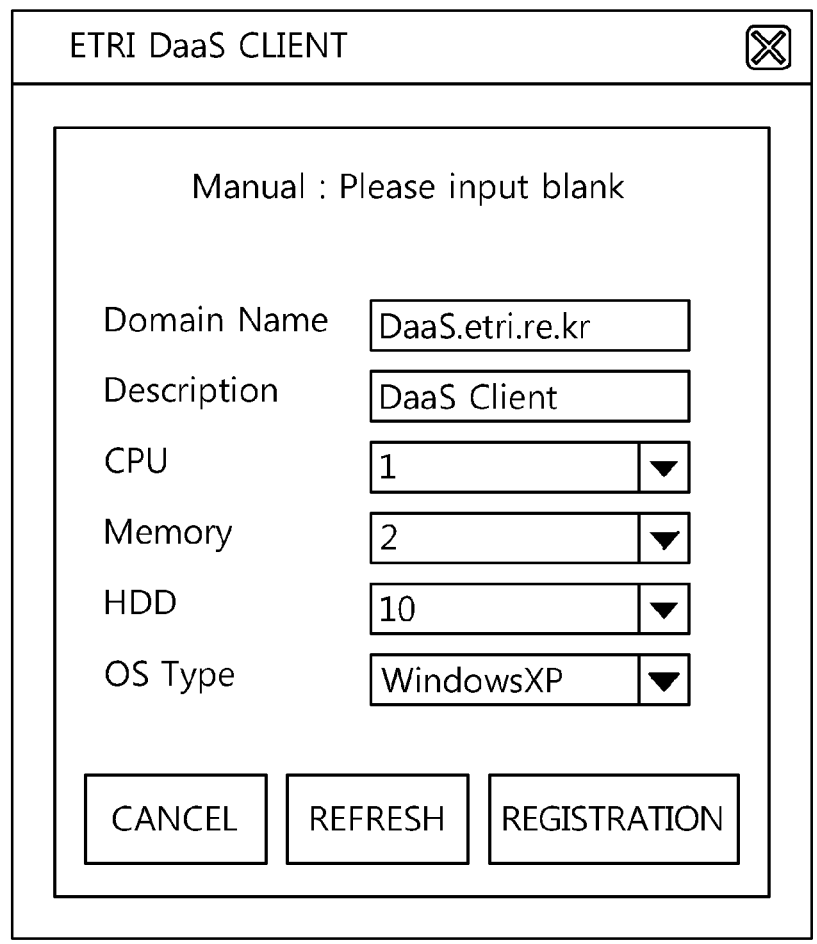
FIG. 22 is a diagram showing an interface for the VM providing method for real-time virtual desktop service in accordance with an embodiment of the present invention.

Referring to FIG. 22, if the VM configuration information is set using the manual method, information about the name Domain Name of a VM, the description of the VM, the number of CPUs of the VM to be provided, the number of pieces of memory to be provided, and the type of hard disk capacity and OS of the VM to be provided are set and registered.

Figure 23:
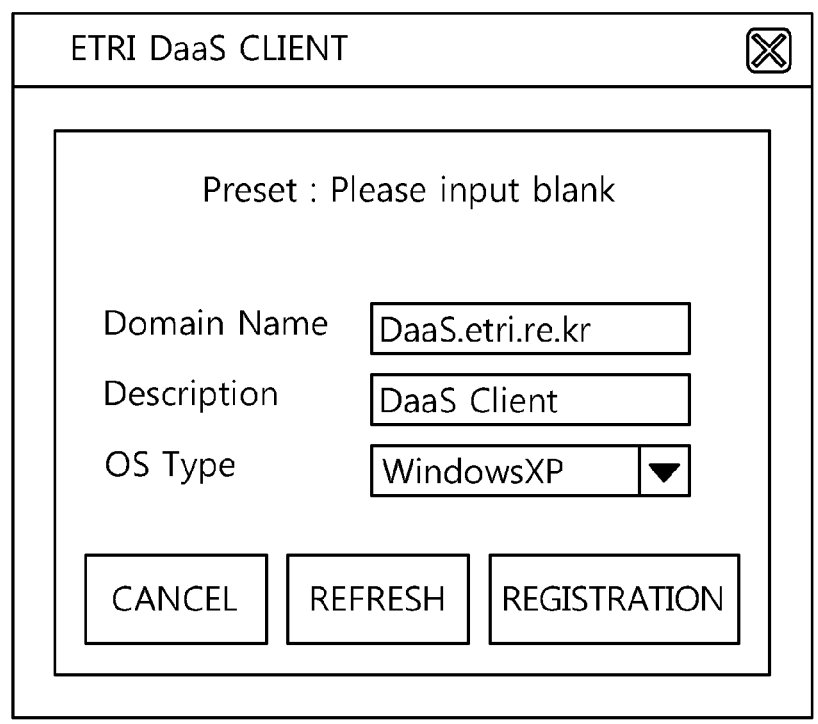
FIG. 23 is a diagram showing an interface for the VM providing method for real-time virtual desktop service in accordance with an embodiment of the present invention.

Referring to FIG. 23, if the VM configuration information is set using the preset method, the service gateway analyzes the right level of the user information and determines the domain name and the type of OS of a VM based on the analyzed right level.

For example, at step S5040, the domain name and the type of OS to be provided may be set by analyzing the grade of a user or an available service level of the user through an inputted office name.

The service gateway selects one of a plurality of service provider servers that provide a VM and generates a VM in the service provider server based on the VM configuration information set using the preset method or the manual method.

Here, preset VM configuration information (i.e., a template) is copied to a designated position, and a predetermined image is renamed at a specific position.

Accordingly, each service provider server needs to previously set a template file suitable for its own server and to have the set template file at a fixed position and also needs to have an image suitable for the capacity of the server by default.

After the VM is generated as described above, the service provider server assigns access information to the client unit.

Here, the access information may include the address and port number of the service provider server that provides the VM.

Thereafter, the client unit accesses the service provider server based on the assigned access information at step S5070.

The service provider server renames a user OS image and a user disk image, corresponding to the VM configuration information set by the user, without experiencing a process of copying a predetermined VM image and provides the renamed user OS image and user disk image to the user at step S5080.

After assignment is completed, the service provider server sends an assignment completion message to the user, and the user may perform booting using the renamed user OS image and user disk image.

As described above, the present invention is advantageous in that an architecture capable of efficiently providing virtual desktop service is provided.

In accordance with the present invention, since the DaaS system includes the virtualization desktop administrator and the client apparatus, the DaaS system can be efficiently managed using a multi-PC system employing desktop virtualization, the DaaS system can be easily applied, and the DaaS system can also be applied to an existing virtualization system.

As described above, in accordance with an embodiment of the present invention, virtual desktop service can be accessed right after the client system is powered on, and a client is also powered off when the VM of virtual desktop service is terminated. Accordingly, there is provided an environment in which users can be provided with VM service without a need to recognize an OS and virtual desktop client software for driving the client.

In accordance with the present invention, a user OS image and a user disk image assigned to a user can be rapidly provided for virtual desktop service.

Furthermore, since a predetermined image disk is assigned, a server load can be greatly improved in a server virtualization environment because an operation of generating a VM and copying an image is reduced.

What is claimed is:

1. An apparatus for virtual desktop service, comprising:
   a connection broker configured to perform an assignment of a virtual machine to a user terminal using the virtual desktop service, to perform a coordination of a delivery protocol used between the user terminal and servers that provide the virtual desktop service, and to manage a user load between the servers, the connection broker providing the user terminal with environmental files, the environmental files including an image of an operating system (OS) which corresponds to a requirement configured by the user terminal;
   a resource pool configured to provide software resources including an operating system, applications, and user profiles to the virtual desktop service; and
   a virtual machine infrastructure configured to support hardware resources and to dynamically assign the hardware resources to the virtual machine,
   wherein the virtual machine infrastructure supports high availability with predefined configuration parameters,
   wherein a plurality of virtual machines in the servers is generated over a single hypervisor,
   wherein the delivery protocol is used to encapsulate and deliver access to an entire information system environment or access to the user terminal over a network, and
   wherein the environmental files are prepared in advance when the virtual desktop service is provided.

2. The apparatus of claim 1, wherein the connection broker further performs a user authentication task of authenticating a user of the user terminal and a license authentication task of authenticating software of the user terminal.

3. The apparatus of claim 1, wherein the connection broker performs the task of assigning the hardware resources and the software resources to the user terminal using the resource pool and the virtual machine infrastructure.

4. The apparatus of claim 1, wherein the hypervisor dynamically assigns the hardware resources and the software resources.

5. A virtual desktop service method, comprising:
   checking, by a connection broker, user profiles of a user terminal for virtual desktop service and searching for a virtual machine suitable for hardware of the user terminal;
   requesting, by the connection broker, a virtual machine infrastructure to generate a corresponding virtual machine if the suitable virtual machine is not present and applying, by the connection broker, the user profiles to a corresponding virtual machine if the suitable virtual machine is present and generating a virtual desktop;
   performing, by the connection broker, a coordination task of coordinating a delivery protocol used between the user terminal and servers that provide the virtual desktop service; and
   sending, by the connection broker, connection information for sending the generated virtual desktop to the user terminal and sending the virtual desktop to the user terminal using a delivery protocol of the virtual desktop,
   wherein the virtual machine infrastructure supports high availability with predefined configuration parameters,
   wherein a plurality of virtual machines in the servers is generated over a single hypervisor,
   wherein the delivery protocol is used to encapsulate and deliver access to an entire information system environment or access to the user terminal over a network, the connection broker providing the user terminal with environmental files, the environmental files including an image of an operating system (OS) which corresponds to a requirement configured by the user terminal, and
   wherein the environmental files are prepared in advance when the virtual desktop service is provided.

6. The virtual desktop service method of claim 5, wherein the connection broker manages a user load between servers for the virtual desktop service.

7. The virtual desktop service method of claim 5, wherein the connection broker performs the task of assigning hardware resources and software resources to the user terminal using a resource pool that provides software resources, comprising an operating system, applications, and the user profiles, and using the virtual machine infrastructure.

8. The virtual desktop service method of claim 7, wherein the hypervisor dynamically assigns the hardware resources and the software resources.

\* \* \* \* \*